United States Patent [19]

Gander

[11] 4,371,867
[45] Feb. 1, 1983

[54] TRANSMITTING SIGNALS OVER ALTERNATING CURRENT POWER NETWORKS

[75] Inventor: Jean-Gabriel Gander, Zug, Switzerland

[73] Assignee: LGZ Landis & Gyr Zug AG, Zug, Switzerland

[21] Appl. No.: 192,827

[22] Filed: Oct. 1, 1980

Related U.S. Application Data

[63] Continuation of Ser. No. 863,468, Dec. 22, 1977, abandoned.

[30] Foreign Application Priority Data

Aug. 25, 1977 [CH] Switzerland ............. 10387/77

[51] Int. Cl.³ ............................................ H04B 3/54
[52] U.S. Cl. ................................... 340/310 R; 307/3
[58] Field of Search ........ 340/310 R, 310 A, 310 CP, 340/163, 167 R, 171 R, 170, 825.06, 825.57, 825.7, 825.71; 307/3, 140; 455/108, 42, 110; 375/25, 59, 68

[56] References Cited

U.S. PATENT DOCUMENTS

| | | | |
|---|---|---|---|
| 3,445,814 | 5/1969 | Spalti | 340/310 R |
| 3,488,517 | 1/1970 | Cowan et al. | 340/310 A |
| 3,509,537 | 4/1970 | Haberly | 340/310 A |
| 3,721,830 | 3/1973 | Oishi et al. | 307/3 |
| 3,818,466 | 6/1974 | Honda | 340/310 A |
| 3,835,389 | 9/1974 | Helfen | 340/310 R |

FOREIGN PATENT DOCUMENTS

| | | |
|---|---|---|
| 1563485 | 5/1970 | Fed. Rep. of Germany . |
| 1563943 | 12/1971 | Fed. Rep. of Germany . |
| 2144996 | 3/1972 | Fed. Rep. of Germany . |
| 2033914 | 5/1977 | Fed. Rep. of Germany . |
| 446962 | 3/1968 | Switzerland . |
| 540607 | 9/1973 | Switzerland . |
| 1142975 | 2/1969 | United Kingdom ............ 340/310 R |

*Primary Examiner*—James J. Groody
*Attorney, Agent, or Firm*—Morgan, Finnegan, Pine, Foley & Lee

[57] ABSTRACT

To transmit signals over an alternating current power distribution network, the network load parameters are modulated by means of non-linear elements or by varying the characteristics of components by electrical action dependent on a reference signal. A reference current, a capacitor voltage, a correction signal for varying an inductance of the network load, the network voltage, an external current source, the total current flowing through a divided network load or its zero passages and those of the network current form the reference signal. The network load is connected by a transformer to the network and comprises at least one series-resonant circuit.

14 Claims, 13 Drawing Figures

TRANSMITTING SIGNALS OVER ALTERNATING CURRENT POWER NETWORKS

This is a continuation of application Ser. No. 863,468, filed Dec. 22, 1977, now abandoned.

BACKGROUND OF THE INVENTION

1. Field of the Invention:

This invention relates to methods of and apparatus for transmitting signals over the lines of an alternating current power distribution network using audio-frequency signals.

2. Description of the Prior Art:

The best known method of transmitting signals over the lines of an alternating current power supply network is the audio-frequency power line carrier control method, otherwise known as the ripple control method. In this method, audio-frequency signals of small bandwidth are transmitted from one or a few centrally located transmitters over the power supply network, and are evaluated in a plurality of receivers distributed about the network, for carrying out instructions of different types. In this method, the transmission speed and consequently the amount of information transmitted per unit of time is relatively small.

Methods are also known which, in many respects, are similar to that described immediately above, and in which for example the counter state of counters distributed about the network, or information concerning the carrying out of instructions in the audio-frequency power line carrier control method are reported back to a central station. Throughout this specification instructions and information will be referred to collectively as "intelligence". Reporting takes place in the opposite direction to the flow of power, and for reporting back it is necessary to have a plurality of transmitters with a relatively small capability, and which must be cheap, whilst there is only one or a few centrally located receivers, which may therefore be relatively expensive.

It has therefore been proposed to evaluate the indication of consumption of fixed quantities of consumed energy, gas, water and the like with the aid of instructions released by audio-frequency power line carrier control signals for the instantaneous coupling of a resonant circuit between two network conductors in the individual counters and by evaluating the signals produced in a station receiver having extremely selective electronic filters (Austrian Pat. No. 241 589). A transmitter of the type indicated hereinbefore suitable for this purpose has also been proposed (Swiss Pat. No. 446 962). This transmitter generates resonant oscillations in a resonant circuit tuned to the audio-frequency, which oscillations decay after a few cycles. Thus, the amplitude of the oscillations in this resonant circuit and in the network supplied therewith is not constant, so that the use of such a transmitter is limited due to the inadequately defined remote control frequencies produced as a result of the unpredictable changing states of the network and the lack of possibility for modulation.

SUMMARY OF THE INVENTION

One object of the present invention is to provide an improved method of transmitting signals over the lines of an alternating current power distribution network using audio-frequency signals.

Another object of the present invention is to provide a method of transmitting signals over the lines of an alternating current power distribution network by variation of network load parameters.

Another object of the present invention is to provide a method of transmitting signals over the lines of an alternating current power distribution network using a series-resonant circuit connected by a transformer to the network.

According to the present invention there is provided a method of producing signals for transmission over the lines of an alternating current power supply network, comprising connecting a load across two conductors of said network, and controlling said load by a signal representing intelligence to be transmitted, wherein the parameters of said load are modulated by one of variation in the characteristics of non-linear electrical elements and variation in the characteristics of electrical components in dependance upon a reference signal.

The invention also provides a transmitter for performing said method.

The above, and other objects, features and advantages of this invention will be apparent from the following detailed description of illustrative embodiments which is to be read in connection with the accompanying drawings.

DESCRIPTION OF THE PREFERRED EMBODIMENTS

Hereinafter the arrangements described are designated as wide band if the instantaneous signal frequency varies very greatly during one information element and as narrow band in the case of substantially constant frequency.

Figure 1:
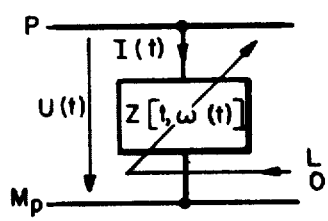
FIG. 1 is a block circuit illustrating the general principle of the invention.

As shown in FIG. 1, a transmitting device comprises a load Z $[t,\omega(t)]$, connected between network lines P and $M_p$. The signal current $I(t)=U(t)/Z(t)$ flowing through the load Z, which is constantly at the network voltage $U(t)$, is produced in a purely passive manner. The load Z can be controlled by the information "L" or "O" to be transmitted and in this way the modulated signal power $P_s(t)=Z \cdot I^2(t)$ can be produced. The action of the load Z on the network is a function of time, due to its dependence on the information to be transmitted.

Transmitting device for narrow band and slow data transmission according to this general principle, in which the network energy is directly utilised for the signal are known. Only damped transient oscillations can be produced with these known arrangements, in which the load is periodically connected to the network lines in dependence on the information "L" or "O" to be transmitted. In a further known transmitting device in which the load Z is constantly connected to the network lines, a relatively high driving power is needed to produce and maintain the undamped oscillations to be transmitted to the network.

The basic concept of the present invention is to utilise the existing network energy directly as the signal energy in a transmitting device for a network heterodyne indicator system without using additional feed equipment, amplifiers and coupling stages; signals with undamped oscillations being produced. The load Z is constantly connected to the network lines P, $M_p$ and its main parameters (for example frequency response, attenuation, etc.) are directly controlled by the information to be transmitted.

In the following examples the signal frequency f is determined by the excitation of an LC series resonant circuit, and the time dependence by a suitable signal current control or a purely electrical component control. Obviously, however, other practical realisations of the invention are possible.

Figure 2:
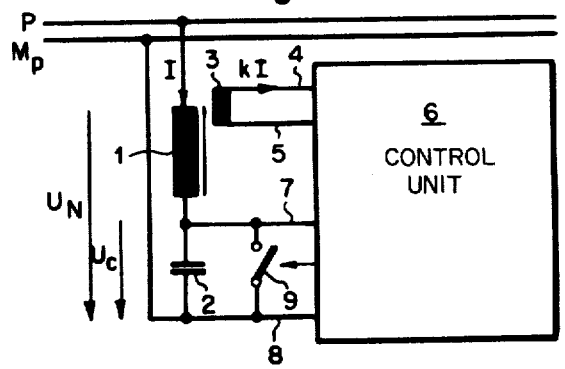
FIG. 2 shows a transmitting device diagrammatically.

The transmitting device of FIG. 2 comprises a resonant circuit connected between a power line P and an earth line $M_p$ as the load Z. The resonant circuit is formed by a coil 1 and a capacitor 2. The coil 1 is provided with a current measuring winding 3 the leads 4 and 5 of which are connected to a control unit 6. Two further leads 7 and 8 provide connections between the two terminals of capacitor 2 and control unit 6. Control unit 6 is arranged to operate a switch 9 connected between the connection point of capacitor 2 to the coil 1, and the earth line $M_p$, so as to be in parallel with the capacitor 2. The switch 9 can comprise a non-linear element, for example a semiconductor element, thyristor, trigger triode or magnetic switch.

The network voltage developed between the phase line P and earth line $M_p$, and consequently across the series resonant circuit formed by coil 1 and capacitor 2 is designated by $U_N$, the current which flows through the resonant circuit by I and the voltage across the capacitor 2 by $U_C$. The current which flows in the current measuring winding 3 is proportional to the current I and has a magnitude kI, k being a predetermined transmission ratio.

Figure 3:
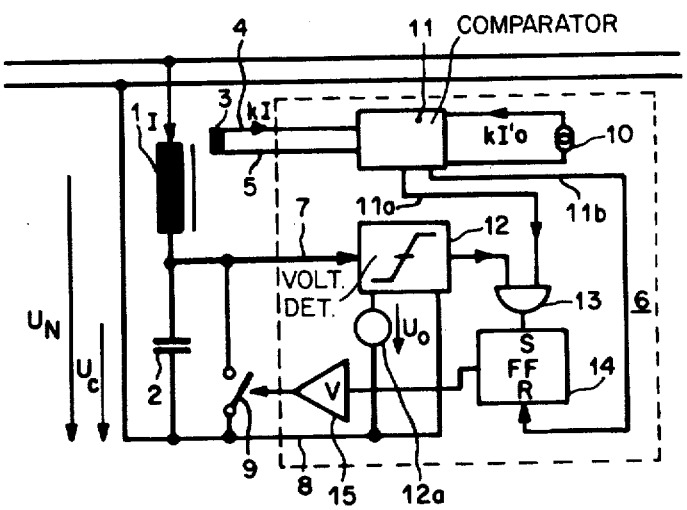
FIG. 3 shows a transmitting device for wide or narrow band frequency transmission.

FIG. 3 shows the individual parts of the control unit 6 in greater detail. The parts which are also common to FIG. 2 have the same reference numerals.

An adjustable current source 10 supplies a comparison current $kI'_o$ which can be compared in a comparator circuit 11 with the current kI in the current measuring winding 3. The voltage across the terminals of the capacitor 2 can be compared with the adjustable reference voltage $U_o$ of a voltage source 12a in a voltage detector 12. A first output 11a of comparator circuit 11 and the output of voltage detector 12 are connected with the inputs of an AND gate 13, the outputs of which is connected to the control input S of a flip-flop 14. The resetting input R is connected to a second output 11b of comparator circuit 11. A connection extends from the output of flip-flop 14 to a final amplifier stage 15 which controls switch 9 and which also determines the signal length.

Figure 6:
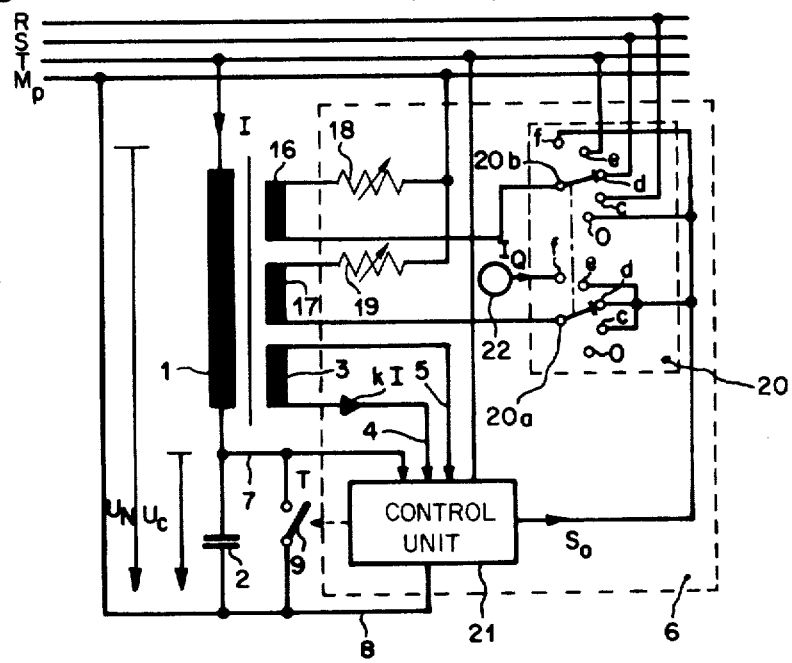
FIG. 6 shows variants of a transmitting device for narrow and wide band signal production.

The transmitting device according to FIG. 6 has a first modulation winding 16 and a second modulation winding 17 for the coil 1, which is not the case in the device of FIG. 3. One terminal of each of these modulation windings 16 and 17 is connected via a variable resistor 18 or 19 respectively to earth line $M_p$, whilst the other terminals are connected to respective ganged wipers 20a and 20b of a multi-way switch 20. Each wiper 20a and 20b has five contacts O, c, d, e and f which it can selectively engage. Contact O associated with wiper 20a is free. Its contacts c, d and e are interconnected and are jointly connected to a signal output $S_o$ of a control unit 21. Contact f is connected to an external current source 22 for supplying a current $I_Q$. Contact O associated with wiper 20b together with its contact f are connected to the signal output $S_o$ of control unit 21. Respective connections extend from the contacts c, d and e of the wiper 20b to the phase lines R, S and T of the power line.

Figure 8:
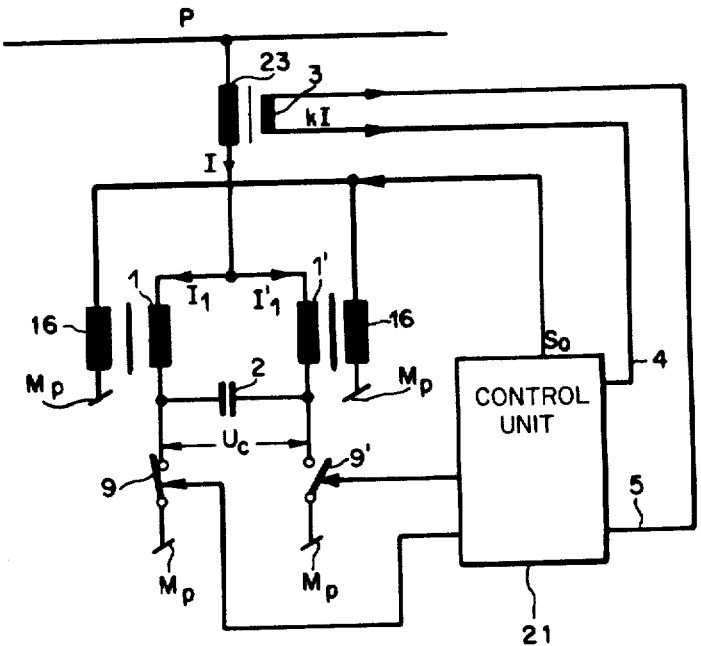
FIG. 8 shows a diagram of a push-pull transmitting device.

FIG. 8 shows the basic circuit diagram of a push-pull transmitting device similar to that of FIG. 6, in which the same parts are given the same reference numerals as before. For reasons of simplicity, modulation winding 17 shown in FIG. 5 has been omitted. Coil 1 has been sub-divided into two coils 1 and 1' with one terminal of one connected to one terminal of the other. Capacitor 2 is connected between the other terminals of the two coils 1 and 1', and to respective contacts of the switches 9 and 9'. The switches 9 and 9' have a common connection to earth line $M_p$. The current measuring winding 3 forms part of a current transformer 23 connected between phase line T and coils 1 and 1'. Modulation winding 16 is sub-divided into two windings connected in parallel, each of which is electromagnetically coupled to a respective one of the coils 1 and 1'. Control unit 21 has inputs 4 and 5 and outputs for the control signal $S_o$ for modulation windings 16, and for the control of the two switches 9 and 9' which can connect the two terminals of capacitor 2 with earth line $M_p$.

Figure 12:
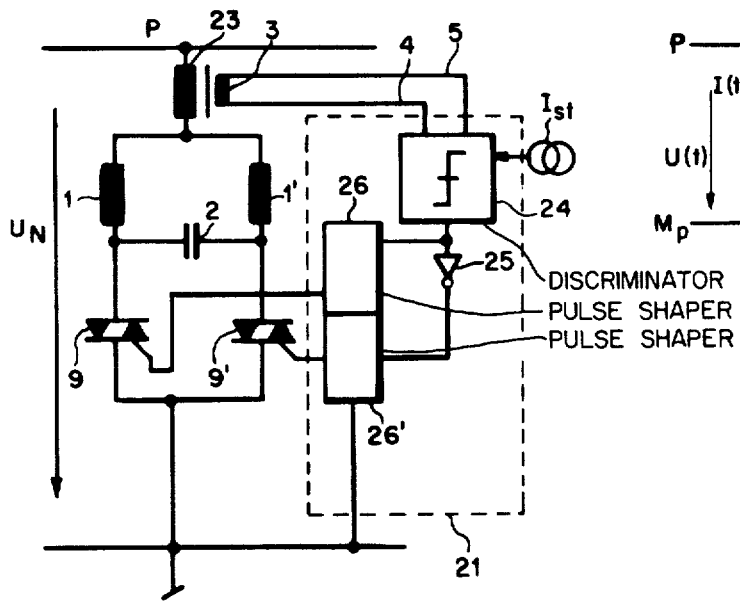
FIG. 12 shows a circuit diagram of a push-pull transmitting device.

FIG. 12 shows the circuit diagram of a simplified practical embodiment of the push-pull transmitting device of FIG. 8, in which the same parts are once again given the same reference numerals. Control unit 21 comprises a discriminator 24, an inverter 25 and two pulse shapers 26 and 26'. The discriminator 24 is on the one hand connected with leads 4 and 5 of current measuring winding 3 and on the other with a further connection for a control current $I_{st}$. The output of discriminator 24 controls the switch 9 via the first pulse shaper 26, and the switch 9' via the inverse gate 25 and the second pulse shaper 26'. The switches 9 and 9' are constituted by trigger triodes connected to the terminals of the capacitor 2 and to the earth line $M_p$. In order to simplify the drawing, control unit 21 is shown only for positive control voltages.

Figure 13:
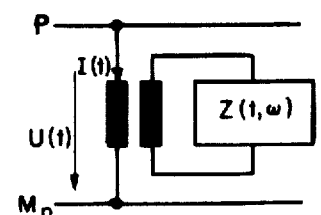
FIG. 13 shows an extension of the circuit of FIG. 1.

FIG. 13 shows a variant of the basic device whereby the load is connected to the network via a transformer. This permits isolation between the network and the transmitting device, and smaller voltages at the latter.

The following mode of operation, which is explained in relation to FIG. 1 is common to all these embodiments:

The action of the controlled network load Z [tω, (t)] is realised in two stages:

1. The spectral displacement in the audio-frequency range of 500 to 20000 Hz is produced by a single LC-resonant circuit energised by the network voltage U(t).

2. The narrow or wide band signal modulation as a function of the information "L" or "O" to be transmitted is produced by component modification by electrical action and/or power drive.

The transmitting device described has the advantage of simultaneously solving two hitherto difficult problems:

1. Deriving the signal power directly from the network and producing large transmitting capacities with maximum efficiency.

2. Effecting transmitter coupling and network isolation by displacing the frequency ω.

In addition, the network fundamental frequency can be used as a synchronising signal, for example in synchronisation of a time pulse position modulation, particularly in the case of a narrow band signal, or as frequency modulation in the case of a wide band signal when the frequency changes during the duration of the signal. Transmission is simplified and made more reliable because the network frequency is also present at the receiver.

The advantages of wide band transmissions have already been described. Such transmissions can be realised particularly easily using transmitting devices according to embodiments of the present invention as will be described hereinafter. A further advantage is that the signal amplitudes of the wide band signals used can be independent of the instantaneous network voltage.

The mode of operation of the transmitting device of FIGS. 2 and 3 will now be explained.

Figure 5:
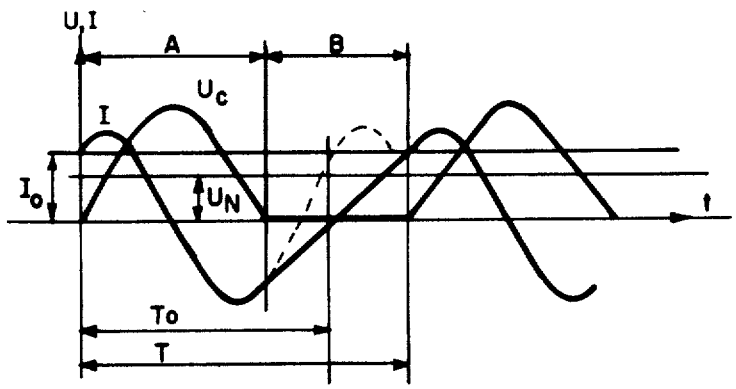
FIG. 5 shows a current/voltage diagram for wide band signal production.
Figure 7:
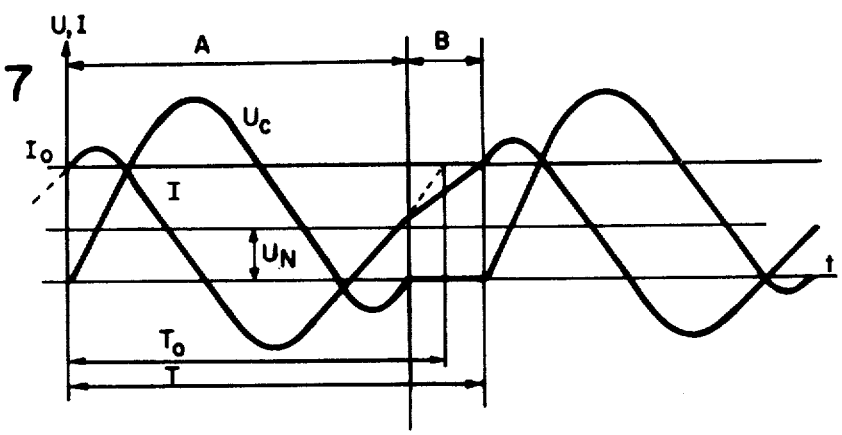
FIG. 7 shows a current/voltage diagram for narrow band signal production.

Two different operating procedures are possible with the same transmitter, as is shown in FIGS. 5 and 7, in which the symbols have the following meanings:

I is the current through coil 1;

$I_o$ is the reference current;

$U_C$ is the voltage across the capacitor 2;

$U_N$ is the instantaneous value of the network voltage;

$T_o$ is the cyclic duration of the resonant frequency of the resonant circuit;

T is the cyclic duration of the signal current;

A is the part of T during which switch 9 is open; and

B is the part of T during which switch 9 is closed.

By means of the current measuring winding 3, the comparator circuit 11 monitors the current I and supplies a logic signal "L" at the first output 11a in the case that $I \geq 0$ and a logic signal "O" in the case that $I < 0$. In a circuit variant, a logic signal "L" is supplied permanently at output 11a. A logic signal "L" appears at the second output 11b when $I \geq I_o$ and a logic signal "O" when $I < I_o$.

Voltage detector 12 always supplies an "L" signal at the output when the voltage $U_C$ across the capacitor 2 is the same as the reference voltage $U_o$. Hereinafter the reference voltage $U_o$ is assumed to be equal to zero. For the first variant of FIG. 5 an "L" signal is permanently present at the output 11a of the comparator circuit 11. The circuit then functions in the following manner:

At the start of a cycle T, the current reaches the value $I_o$ so that the "L" signal at the output 11b resets the flip-flop 14 at the re-setting input R thereof and as a result switch 9 is opened. The current I in coil 1 now flows into capacitor 2. As is shown in FIG. 5, the current I and the voltage $U_C$ in the resonant circuit are approximately sinusoidal. During the next zero passage of voltage $U_C$, voltage detector 12 supplies an "L" pulse to the control input S of the flip-flop 14, so that the latter is set to "L" and as a result switch 9 is closed at the end of time interval A. At this moment current I is negative and increases exponentially until the value $I_o$ is again reached at the end of interval B and consequently also at the end of cycle T.

For the second variant according to FIG. 7, the logic signal of output 11a of comparator circuit 11 corresponds to the sign of current I. At the start of a signal cycle, switch 9 is opened and the resonant circuit operates as in the first variant.

In the first zero passage of $U_C$, $I < I_o$, and there is a "O" signal at output 11a, so that the "L" pulse of the voltage detector 12 is held in AND gate 13. It is only during the next zero passage of $U_C$ that $I > I_o$, so that the "L" pulse of the voltage detector 12 passes via AND gate 13 to the control inputs of the flip-flop 14 and sets the latter to "L" so that switch 9 is closed again at the end of interval B. During interval B, the current I through the coil 1 again rises to the value $I_o$ and a new cycle starts. Unlike in the first variant, the current I is positive again at the start of interval B.

The time necessary to reach the value $I_o$ is consequently significantly shorter in the second variant than in the first, and is dependent on the losses in the resonant circuit. The interval A is approximately the same as the cycle $T_o$ of a damped oscillation of voltage $U_C$ across the capacitor 2 and depends only slightly on the network voltage $U_N$. Thus the signal frequency $f = 1/T$ is only slightly higher than the natural frequency $f_o = 1/T_o$ of the resonant circuit, and is virtually independent of the network voltage $U_N$, so that the transmitting device of FIG. 3 supplies a narrow band signal whose frequency corresponds to the natural frequency of the resonant circuit.

The transmitting device of FIG. 6 is suitable for supplying a wide band signal when operating in accordance with FIG. 7, whereby the instantaneous frequency during a half-cycle of network voltage $U_N$ is dependent on the latter.

Figure 4:
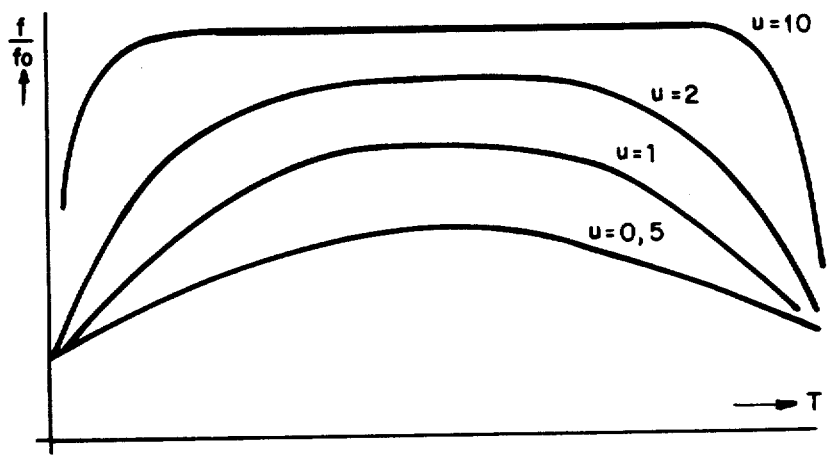
FIG. 4 shows transmitting frequency/time diagrams.

This dependence of the ratio $f/f_o$ is determined by the parameter:

$$u = U_N/\omega L I_o$$

and is shown in FIG. 4.

In the case of large values of u, that is small values of $I_o$, the frequency change is small, and with low values of u a wide band signal is developed.

As comparison current $I_o$ can be selected freely, a control arrangement as shown in FIG. 5 makes it possible to produce frequency deviations during half a cycle of the network frequency and are, for example, characteristic of various logic states (FIG. 4). In the case of a very simple embodiment, a "O" information signal can be represented by the use of modulation during positive network oscillations and an "L" information signal by the same modulation during negative network oscillations.

The signal length can also be regulated using switch 9. As a function of the network frequency it is preferably set at 10 ms, so that signals are obtained with a frequency modulation which is dependent on the sinusoidal network voltage during this period. In this way, for example for transmitting digitally represented data for an "L" signal, a signal with a maximum frequency deviation of:

$$f/f = 0.5$$

(see FIG. 4) can be selected, and for a "O" signal, a signal with a maximum frequency deviation of two can be obtained, if by means of the comparison current $I_o$, $u=0.5$ is set for the first state and $u=2$ for the second state. This setting can take place in current source 10 by a corresponding tap on a variable resistor. When selecting $u=10$, a narrow band signal can be produced which is modulated with a single frequency during most of the time duration of a half-cycle of the network frequency.

The frequency-modulated wide band signal is particularly suitable for the transmission of counter states or other data by means of numerous transmitting devices distributed over the network, in the reverse direction to the network energy flow, to one or several receivers arranged in a station for the collection of this data. The transmitting devices are simple and inexpensive because they can be constructed with a few semiconductor components. If the frequency deviation has a particular form, the signals received can be compressed and detected by a demodulation system matched to the modulation in the transmitting device, either on a time basis and/or on a frequency basis. As the frequency interference present in the transmission path is distributed discreetly over the signal spectrum and the interference pulses are distributed time-discreetly over the signal duration, it is possible to obtain by means of suitable noise filters a reliable, sensitive transmission system with a high signal/noise ratio, because the interference signals have a much smaller power level than the wanted signals following noise filtering and compression.

The examples describe practical embodiments where $Z[t,\omega(t)]$ is connected directly between the power lines. Thus, very powerful signals can be produced with these transmitting devices. Only a very limited energy supply is required for controlling the production of oscillations in the control unit 6, only in fact a few tenths of one percent of the oscillation energy generated, and does not require large feed units for producing the signals.

FIG. 6 shows in one diagram five different embodiments of the invention, whereby each construction corresponds to one position of multi-way switch 20. Each of these embodiments can be used alone or in combination with others. In principle the circuit corresponds to that of FIG. 3, but two modulation windings 16 and 17 are provided on coil 1. The saturation of the core of coil 1 is controlled by a pulse through one or both windings 16 and 17 and this leads to a change in the inductance.

Control unit 21 differs from that of FIG. 3 in that an additional connection is possible with one of the three phase lines R, S, T, and in that an output signal $S_o$ can be produced which with the aid of a modulation winding 16 or 17 permits the control of the transmitter characteristics, for example the linearisation of the usually non-linear characteristics of the core of the coil 1.

The following variants are possible:

The correction signal $S_o$ is supplied to the winding 16 in position O of the multi-way switch 20. The winding 17 is not connected, and in this case can be omitted. The signal $S_o$ produces in the winding 16 a current which can be adjusted with the variable resistor 18. This brings about the linearisation mentioned hereinbefore. The variable resistor 18 can also be used to adjust the fundamental frequency $f_o$.

When the wipers 20a and 20b of multi-way switch 20 are in position c, d, or e, a correction, adjustable by means of the variable resistor 19, of the fundamental frequency $f_o$ is brought about by modulation coil 17 which is then connected between the line with the correction signal $S_o$ and the earth line $M_p$. There is also a modulation, adjustable by variable resistor 18, by means of modulation coil 16. As in these positions modulation coil 16 is located between one of the phase lines R, S and T and earth line $M_p$, an audio-frequency signal modulated during a signal length with a varying frequency is produced which, depending on the position of wipers 20a and 20b, is displaced relative to the other by 120°. Corresponding codes can be associated with these reciprocally phase displaced frequency-modulated wide band signals and can be evaluated in the correspondingly equipped receivers following their transmission over the power lines. As stated hereinbefore, a compression of the signals, resulting in effective noise filtering, is possible at the receiver for wide band signals having a frequency variation. This leads to increased sensitivity of the receiver and consequently to an improved signal/noise ratio. The corresponding demodulation can be derived in a similar manner from the network frequency in the receivers. As was described hereinbefore, in this case a matched demodulation to the transmitter modulation takes place in the receiver.

A further possibility of modulation of the fundamental frequency $f_o$ of the resonant circuit is provided by position f of wipers 20a and 20b of multi-way switch 20. In the latter case the correction of the desired frequency $f_o$ is effected by means of correction signal $S_o$ in the modulation coil 16 and modulation by modulation coil 17 by means of the current $I_Q$ of an external current source 22. The latter can provide a fixed current $I_Q$ which produces a frequency in the resonant circuit which varies by a fixed amount from the fundamental frequency $f_o$ and is used for corresponding intelligence. The current $I_Q$ supplied by current source 22 can also be variable during the duration of a signal and optionally synchronised with the network frequency, thus producing a corresponding predetermined frequency change in the resonant circuit during the duration of a signal. This can once again be compressed in the receiver in a time-based and/or frequency-based manner by demodulation matched to the modulation in the transmitter. Other variants of the control system are possible and correction signal $S_o$ can be omitted or set to zero.

Figure 9:
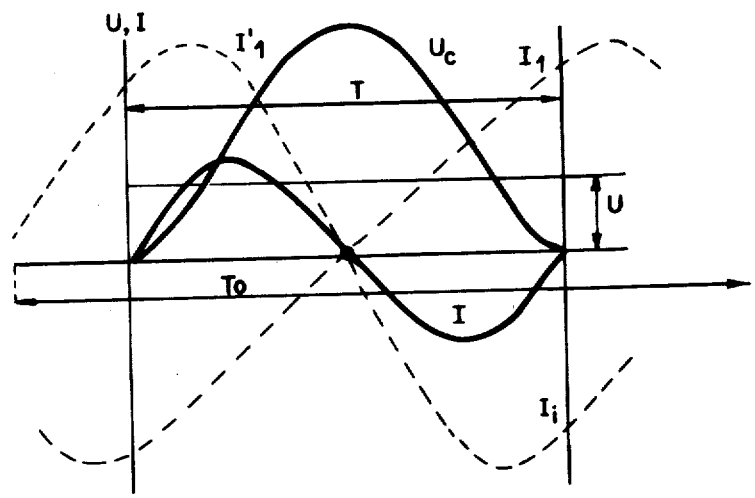
FIG. 9 shows a current/voltage diagram.

The transmitting device of FIG. 8 functions in a similar manner to that of FIG. 6; see the diagram of FIG. 9. However, the voltage $U_C$ across capacitor 2 need not necessarily be monitored in this embodiment. The switches 9 and 9' are arranged and/or controlled in such a way that the switch 9 is always closed when the switch 9' is open and vice-versa. When the switch 9 closes, current $I'_1$ through the coil 1' has the form of a sinusoidal oscillation like the current I in cycle A of FIG. 5. The current $I_1$ in coil 1 then assumes the form of exponential charge as in cycle B of current I in FIG. 5. The resulting current I through the current transformer 23 then has the form of a sinusoidal oscillation in cycle T. Following the time where the current $I_1 = -I'_1$ and where the switch 9 is open and the switch 9' closed and up to the next switching over, the current paths of current I and I' are reversed compared with the first cycle. Switching over only takes place by monitoring current I and always at the time where current I changes from minus to zero. The circuit functions like a multivibrator.

The signal duration can be determined for example by an on/off switch (not shown) at the terminals of the current measuring winding 3. The oscillations start automatically on closing this switch. Voltage $U_C$ at the terminals of the capacitor 2 is approximately zero during each switching of the switches 9 and 9'.

The signal shapes are determined by the ratio:

$$f/f_o$$

Figure 10:
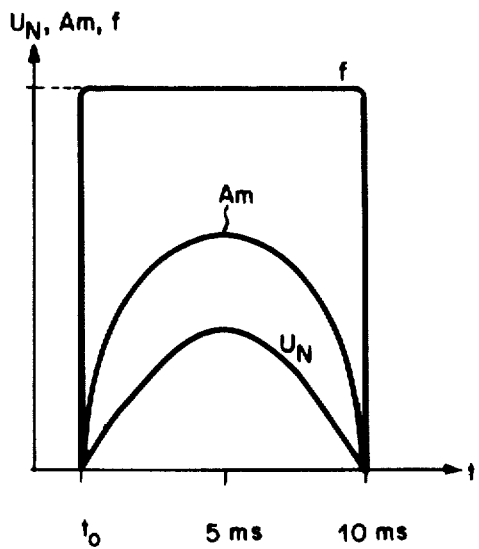
FIGS. 10 and 11 show frequency/time diagrams.
Figure 11:
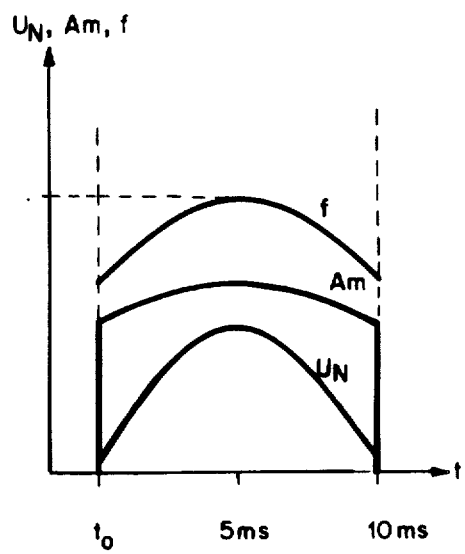

At particular ratios of:

$$f/f_o$$

over a half-cycle of network voltage $U_N$, only a single fundamental frequency f is, for example, formed (see FIG. 10) and consequently a narrow band signal. In the case of a smaller ratio:

$$f/f_o$$

a wide band signal is formed in which the frequency within a half-cycle of network voltage $U_N$ fluctuates by about 25% as shown in FIG. 11. There is also a fluctuation of amplitude Am which is smaller at lower frequencies and maximum at the maximum frequency. This is particularly advantageous if the device of FIG. 8 is used for reporting back information in the reverse direction to the flow of network energy at higher transmission frequencies, because in this case the higher damping of the transmission path at higher frequencies is compensated.

The device of FIG. 8 can be modulated in much the same way as that of FIG. 6 by an additional winding (not shown) on coil 1 and/or coil 1', corresponding to the modulation winding 17 of FIG. 6, or by modifying another component, for example the capacitor 2. In this case even with a specific ratio:

$$f/f_o$$

an oscillation can be produced with a frequency which changes over the signal duration, and consequently is a wide band signal.

A different criterion can be selected in place of the zero passages of current I in current transformer 23. An example is the function $I(t) - I_{st}(t) = 0$ in which $I_{st}$ is a control current. A corresponding device is shown in FIG. 12.

This device is a simple embodiment of the circuit of FIG. 8 in which a discriminator 24, two pulse shapers 26 and 26', and an inverter 25 are used in the control unit 21, and the switches 9 and 9' are constructed as trigger triodes. The discriminator 24 is controlled by current I in the current measuring winding 3 of the current transformer 23 and control current $I_{st}$ and this controls the switch 9 via the pulse shaper 26 and the switch 9' via the inverter 25 and the pulse shaper 26'. If only a single frequency is to be produced, a pulse transformer can be used in place of the control unit 21.

It is pointed out that the voltage on load Z (for example voltage $U_C$ at the capacitor 2) can be very large, particularly in the case of wide band embodiments. In this case it is advantageous to couple the load Z to the network by means of a transformer with the voltage lower on the load side. As a result, isolation is possible between the network and the transmitting device (see FIG. 13).

The transmitting device described are characterised in their simplicity. Only a few discreet and/or integrated semiconductor component are used in their construction. They permit a high transmitting capacity with a high efficiency, because control requires little energy. They make it possible to produce signals with very stable fixed frequencies as well as frequency, amplitude and/or phase-modulated wide band signals with a frequency which varies during the pulse duration, permitting a high signal/noise ratio by filtering and limiting at the receiver and by time-based and/or frequency-based compression.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of producing intelligence signals for transmission over the lines of an alternating current power supply network in response to an input reference signal comprising:
   connecting a resonant circuit including a capacitive device to the lines of the power supply network;
   controlling the charging and discharging of said capacitive device from the power supply network;
   said charging and discharging of said capacitive device being controlled in response to intelligence to be transmitted to periodically charge said capacitive device so that said resonant circuit produces an intelligence signal for transmission over the power supply network; and
   wherein said control is effected in dependence on a comparison of the current flowing through said resonant circuit and the reference signal.

2. A method according to claim 1 wherein said control is effected additionally in dependence on the voltage across said capacitive device.

3. A method according to claim 1 wherein a narrow or wide band signal is produced for transmission in dependence on the ratio:

$$u = \omega U_N/LI_o$$

in which $U_N$ is the network voltage; $\omega = 2\pi$; f is the resonant frequency of said resonant circuit, L is the inductance of said resonant circuit; and $I_o$ is an adjustable reference current.

4. A method according to claim 3 wherein said control effects variation of said inductance.

5. A method according to claim 4 wherein said control is effected in dependence on a correction signal produced by comparison of the observed signal frequency on the line of the power supply network with the desired signal frequency of the reference signal.

6. A method according to claim 4 wherein said control for producing a wide band signal is effected additionally in dependence on the instantaneous magnitude of the network voltage on a specific network phase line.

7. A method according to claim 4 wherein said control is effected in dependence on the reference signal supplied by an external current source.

8. A method according to claim 1 wherein said resonant circuit is divided to provide two alternately operable resonant elements, and said control is effected in dependence on the total current flowing through said divided resonant circuit.

9. A transmitting device for producing intelligence signals over the lines of an alternating current power supply network comprising
  a resonant circuit connected to the power supply network,
    said resonant circuit including a capacitive device;
  switch means connected to control charging and discharging of said capacitive device; and
  control means connected to said switch means to periodically permit charging of said capacitive device from said power supply network so that said resonant circuit produces an intelligence signal on the power supply network; and
  wherein said control means includes
    a bistable circuit connected to control the state of said switch means in accordance with the state of said bistable circuit;
    a comparator circuit responsive to current through said resonant circuit and operative to place said bistable circuit in a reset state when current through said resonant circuit reaches a predetermined level; and
    a voltage detector responsive to the voltage across said capacitive device and operative to place said bistable circuit in a set state when a predetermined voltage across said capacitive device is detected.

10. A transmitting device according to claim 9 wherein said resonant circuit includes an inductor with a coupled winding connected to said control means.

11. A transmitting device according to claim 9 wherein said resonant circuit comprises at least one series resonant circuit resonant at an audio frequency.

12. A transmitting device according to claim 9 wherein said resonant circuit comprises an inductor and said capacitive device connected in series between said lines of said network, and said switch means is a switch connected across said capacitive device.

13. A transmitting device according to claim 9 wherein said switch means comprises a semiconductor element.

14. A transmitting device according to claim 9 wherein said switch means comprises a trigger triode.

* * * * *